(12) United States Patent  (10) Patent No.: US 7,591,558 B2
Wezowski et al.  (45) Date of Patent: Sep. 22, 2009

(54) DISPLAY BASED ON EYE INFORMATION

(75) Inventors: Martin Marcin Robert Wezowski, Malmo (SE); Pontus Nils Frans Jarenskog, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 144 days.

(21) Appl. No.: 11/421,188

(22) Filed: May 31, 2006

(65) Prior Publication Data

US 2007/0279591 A1 Dec. 6, 2007

(51) Int. Cl.
*A61B 3/00* (2006.01)
*A61B 3/14* (2006.01)

(52) U.S. Cl. ........................................ 351/246; 351/208
(58) Field of Classification Search ......... 351/205–208, 351/246
See application file for complete search history.

(56) References Cited

U.S. PATENT DOCUMENTS 5,500,671 A * 3/1996 Andersson et al. ......... 348/14.1
6,302,541 B1 * 10/2001 Grossmann ................. 351/240
2003/0095155 A1 * 5/2003 Johnson ..................... 345/864
2004/0174496 A1 * 9/2004 Ji et al. ...................... 351/209

FOREIGN PATENT DOCUMENTS

EP         0 816 982 A2   1/1998
WO         WO 02/37412 A1  5/2002

OTHER PUBLICATIONS

Written Opinion and International Search Report for corresponding PCT application; dated Jun. 11, 2007; 8 pages.
International Report on Patentability dated Jul. 4, 2008 issued in corresponding PCT application No. PCT/IB2006/054538, 7 pages.

* cited by examiner

*Primary Examiner*—Ricky L Mack
*Assistant Examiner*—James R Greece
(74) *Attorney, Agent, or Firm*—Harrity & Harrity, LLP

(57) ABSTRACT

A method includes determining a distance between an eye and a device, and adjusting a scale of content displayed on the device based on the distance.

18 Claims, 13 Drawing Sheets

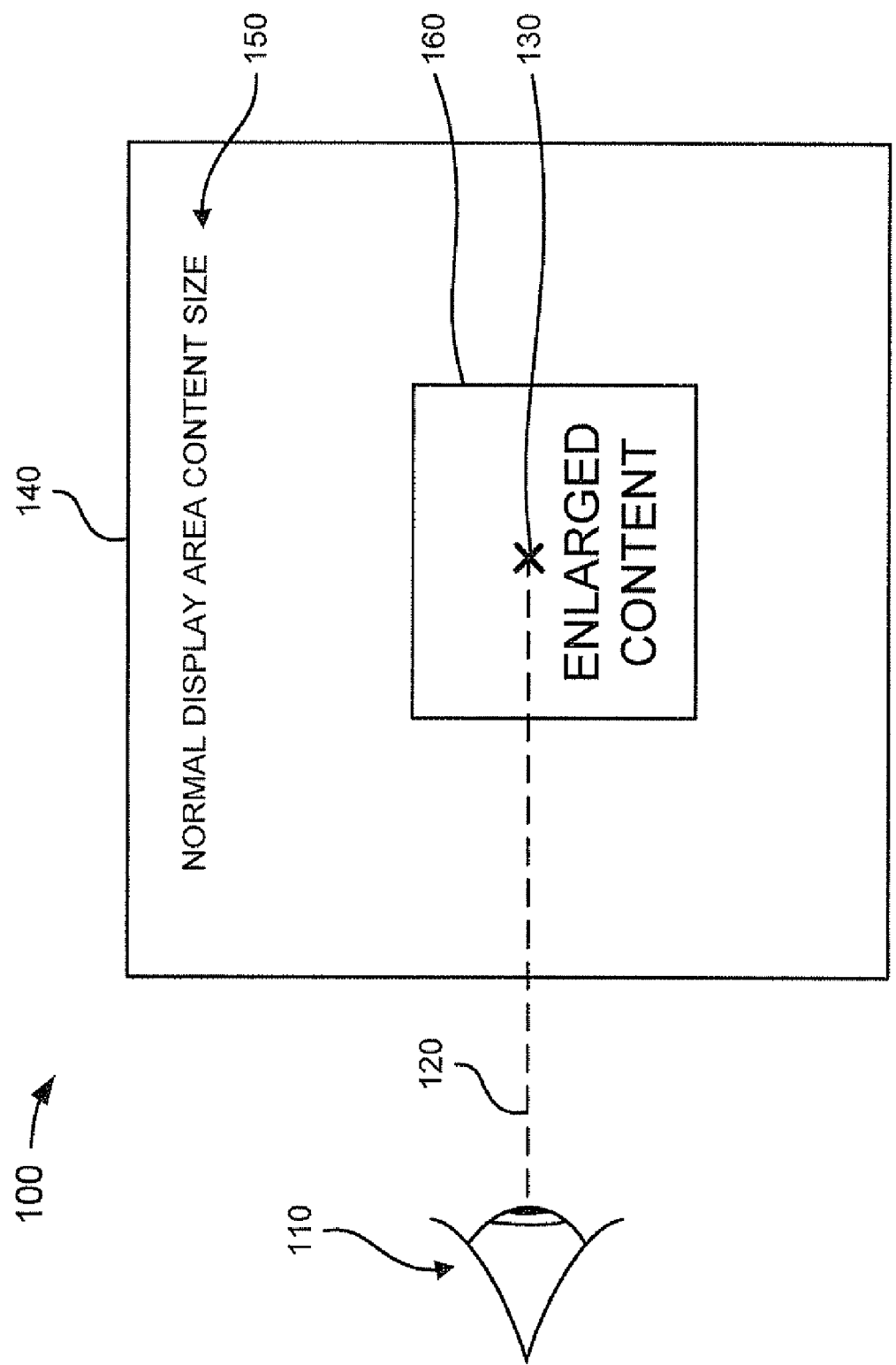

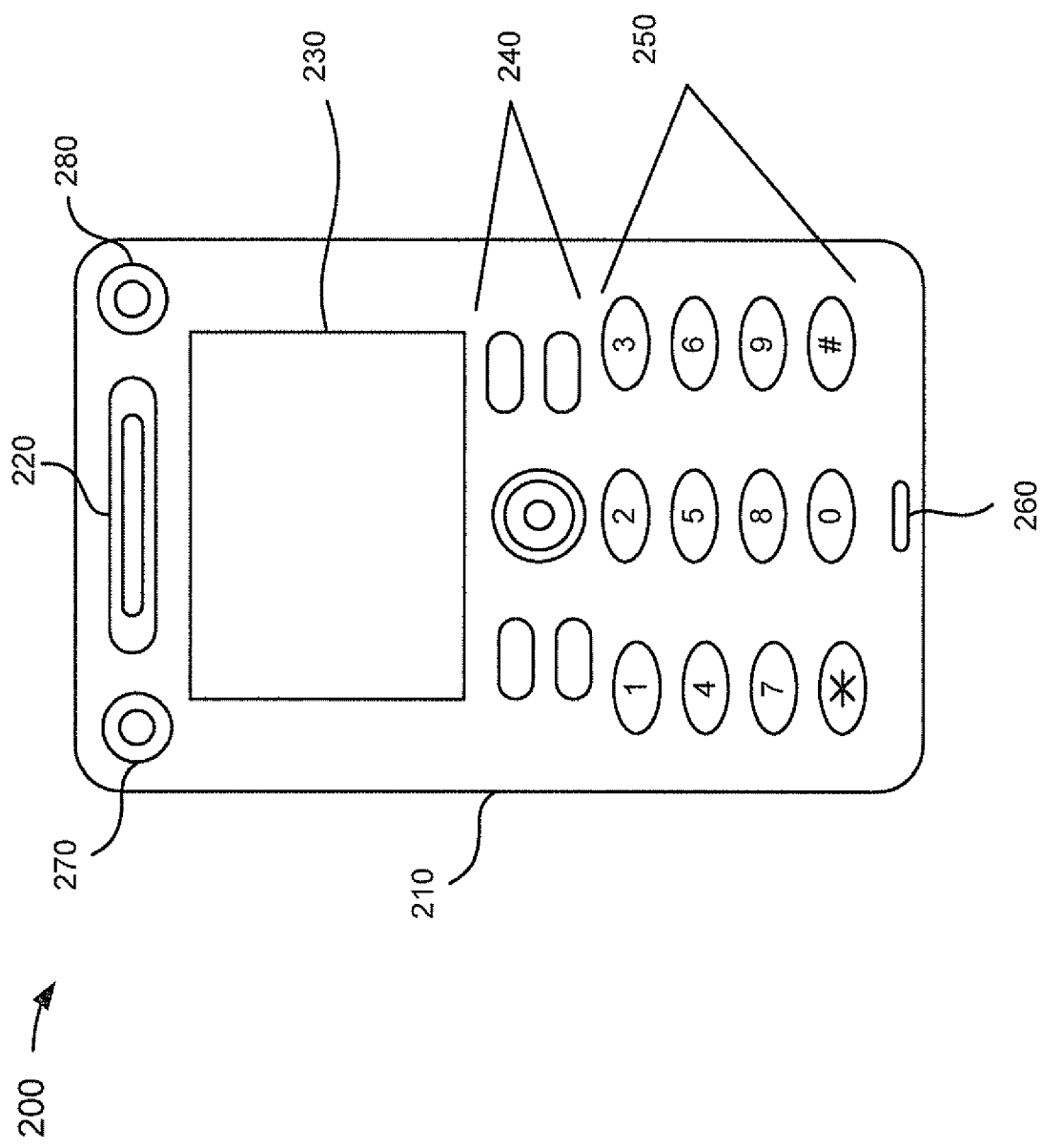

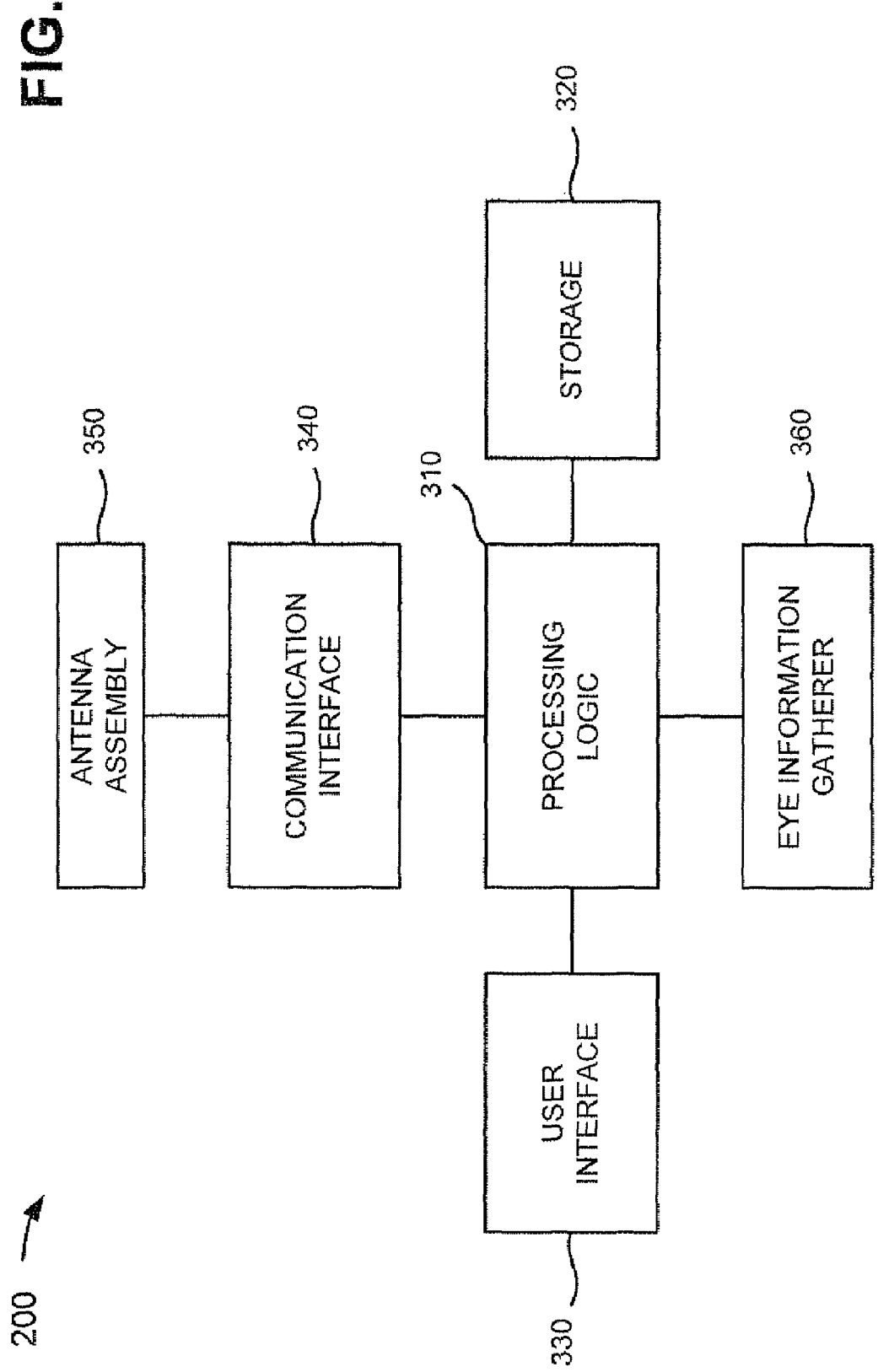

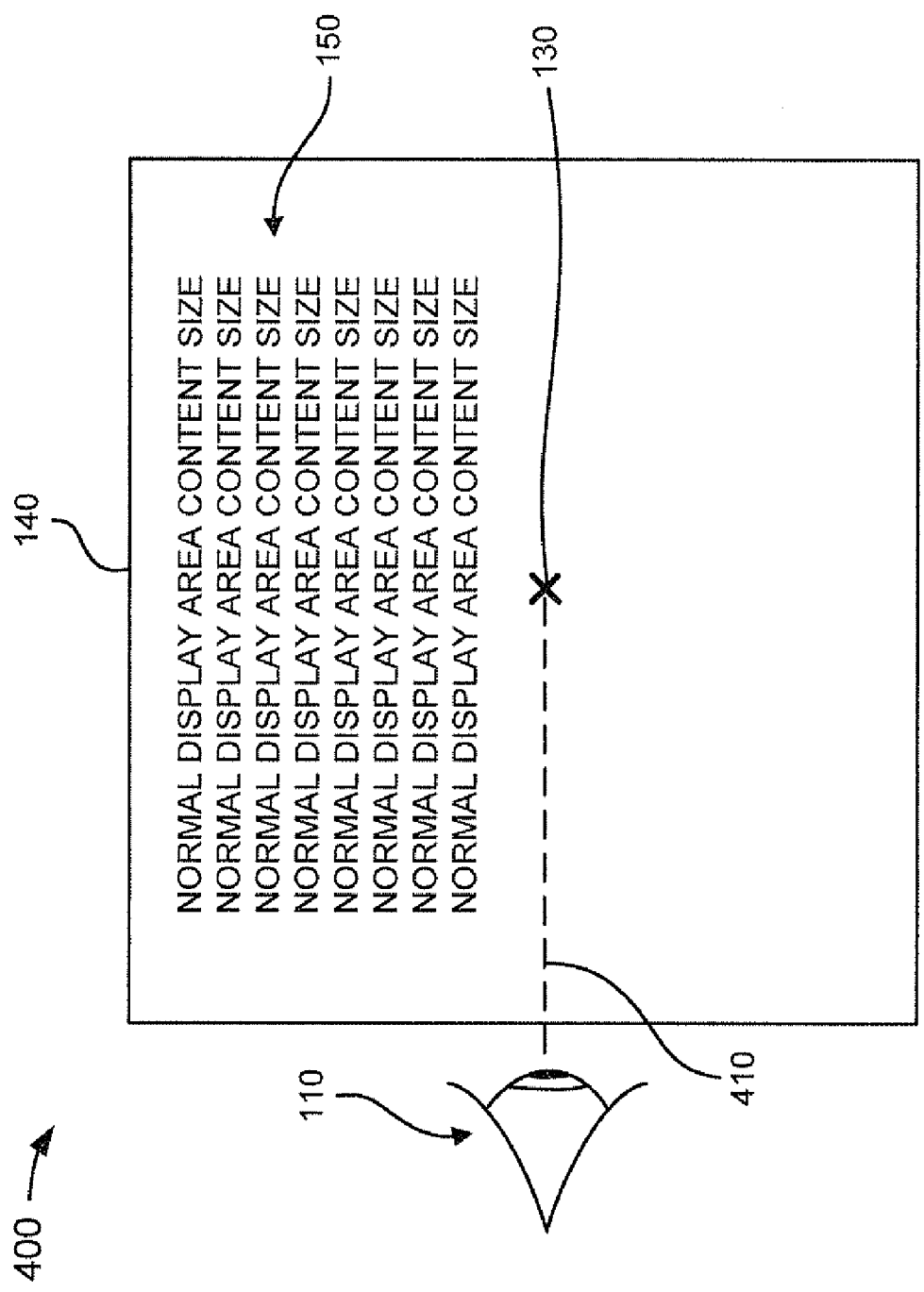

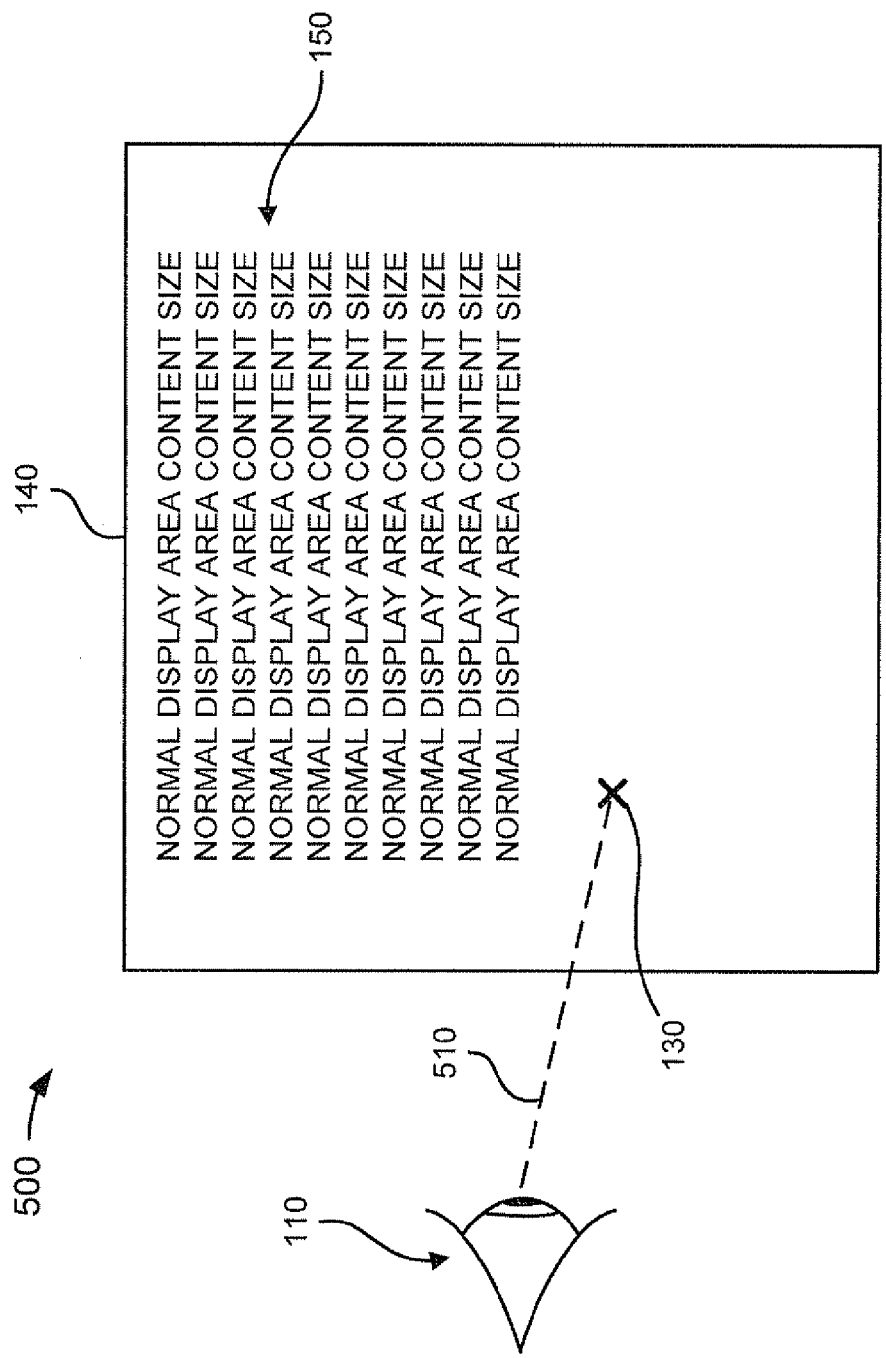

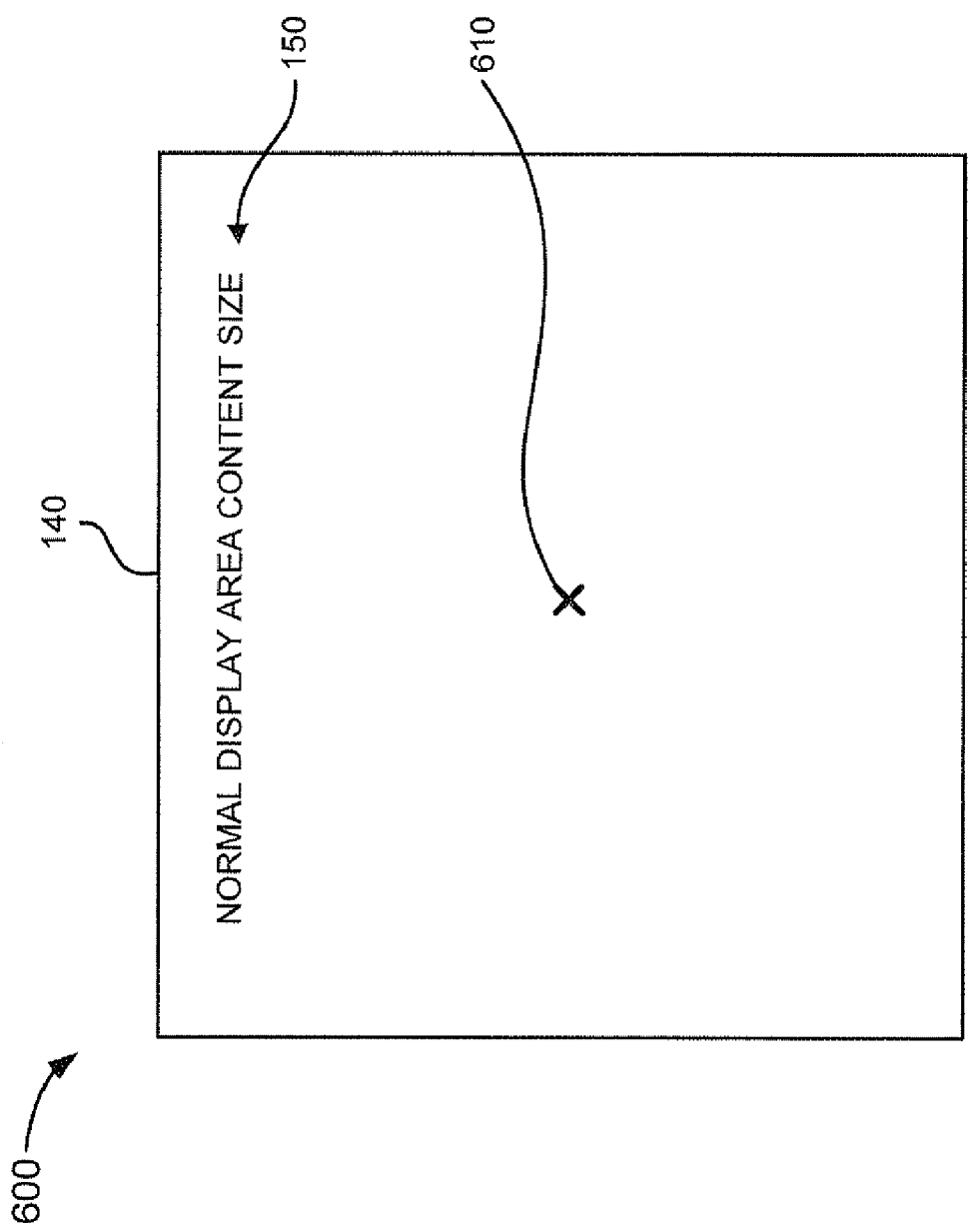

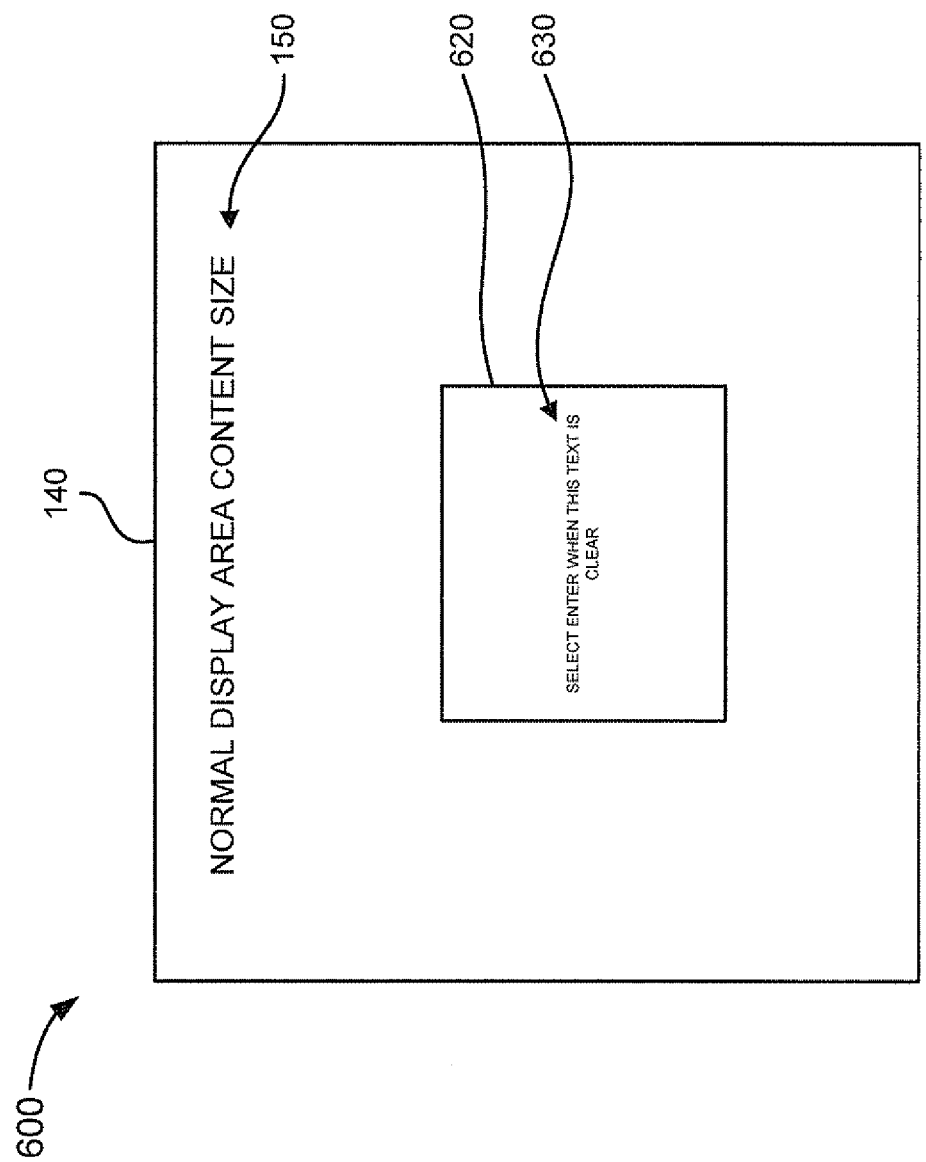

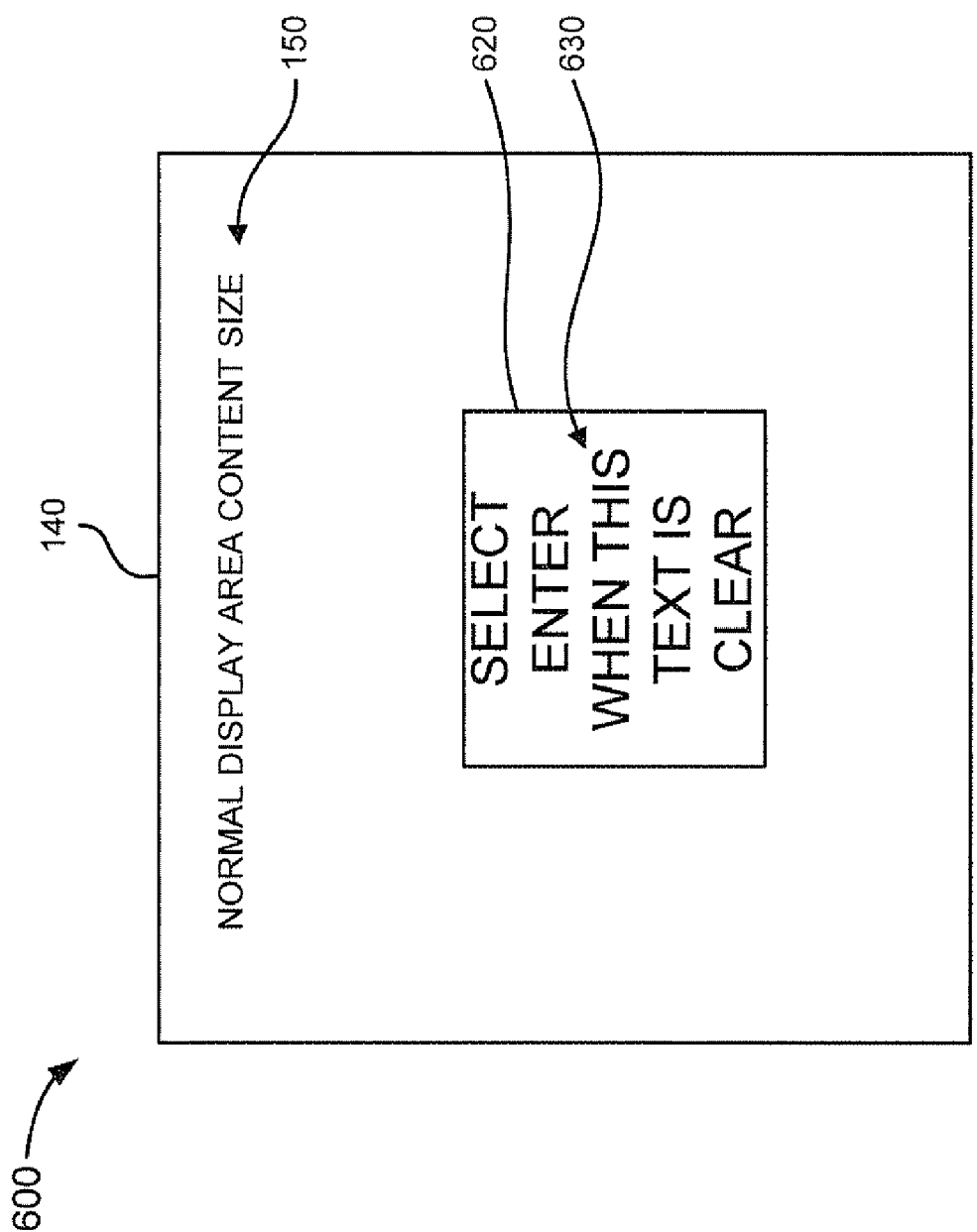

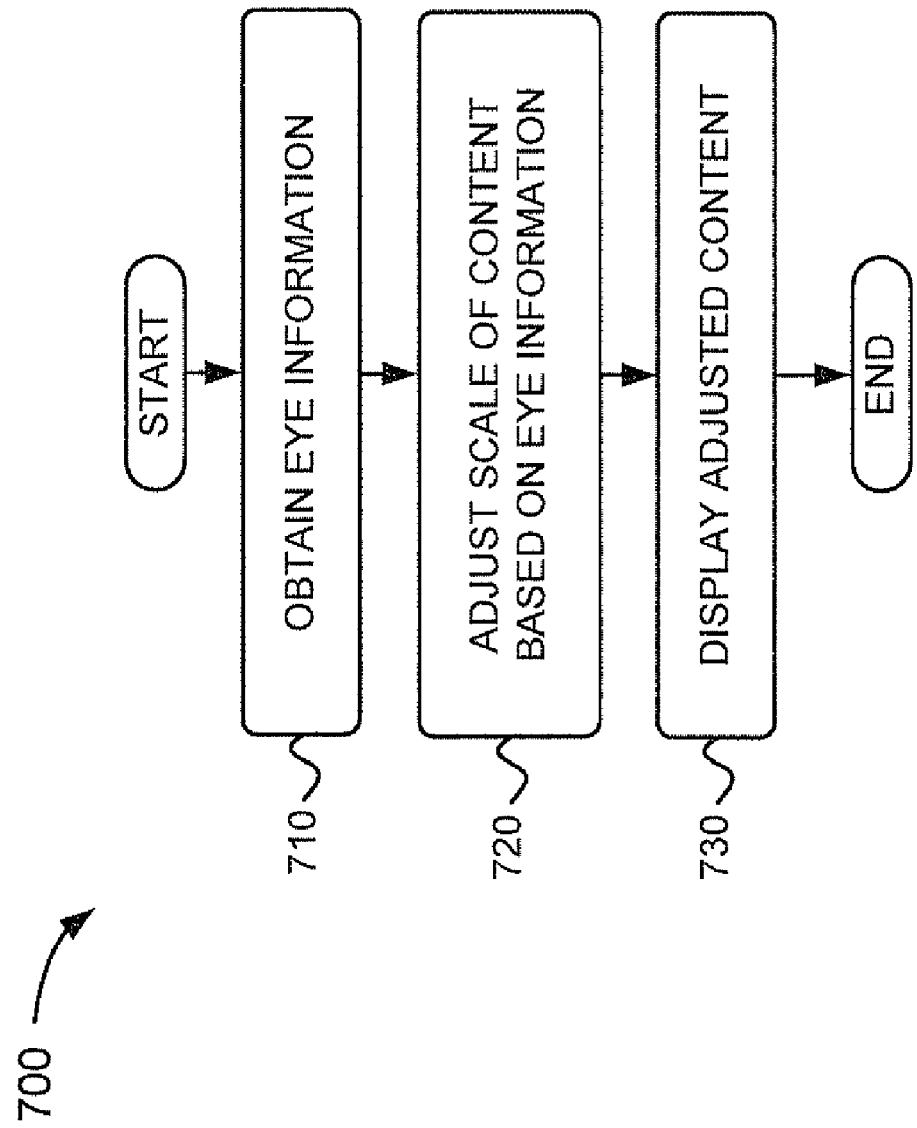

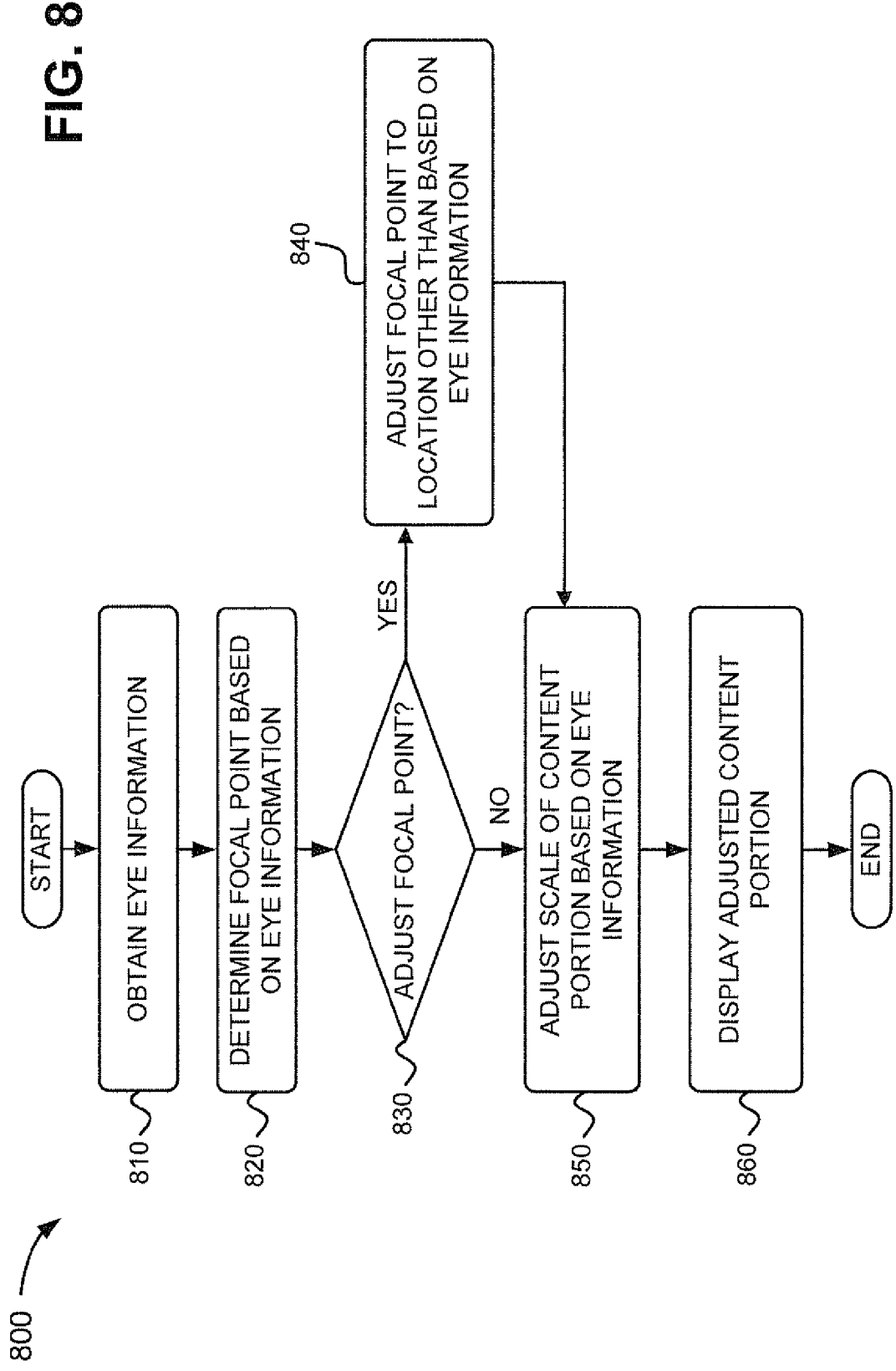

DISPLAY BASED ON EYE INFORMATION

BACKGROUND

1. Field of the Invention

Implementations described herein relate generally to devices and, more particularly, to a display that adjusts based on eye information.

2. Description of Related Art

Small displays on mobile communication devices present problems when they attempt to convey large amounts of information within their confines. For example, a mobile communication device may display a list of telephone numbers to aid a user with locating a telephone number. However, depending upon the size of the content (e.g., the list of telephone numbers) on the display and the distance the display is from the eyes of the user, the user may have to move the device closer to his/her eyes in order to view the content clearly. Likewise, the user may wish to enlarge a portion of the content on the display (e.g., a particular telephone number in the list), but may be unable to perform such a task without moving the content portion closer to his/her eyes. Finally, users with vision disorders may need the content displayed on the device to be enlarged more so than users without vision disorders.

SUMMARY

According to one aspect, a method may include determining a distance between an eye and a device, and adjusting a scale of content displayed on the device based on the distance.

Additionally, the method may include determining the distance with a distance sensor included in the device.

Additionally, the method may include decreasing the scale of the content displayed on the device as the distance decreases.

Additionally, the method may include increasing the scale of the content displayed on the device as the distance increases.

Additionally, the increasing the scale of the content may include one of increasing the scale of the content continuously as the distance increases, increasing the scale of the content in discrete steps as the distance increases, increasing the scale of the content logarithmically as the distance increases, or increasing the scale of the content exponentially as the distance increases.

Additionally, the method may include adjusting the scale of the content based on a user controlled content scaling.

Additionally, the method may include determining a focal point of the content based on the eye information, and adjusting a scale of a portion of the content corresponding to the focal point based on the distance.

Additionally, the method may include displaying the adjusted content portion on the device.

Additionally, the method may include increasing the scale of the content portion corresponding to the focal point as the distance increases.

Additionally, the method may include determining the focal point with an eye tracking sensor included in the device.

Additionally, the method may include adjusting the focal point to a point in the content based on a user inputted location.

Additionally, the method may include adjusting the scale of a content portion corresponding to the adjusted focal point based on the distance.

According to another aspect, a method may include obtaining eye information associated with a device, determining a focal point of content displayed on the device based on the eye information, and adjusting a scale of a portion of the content based on the focal point.

Additionally, the method may include displaying the adjusted content portion on the device.

Additionally, the method may include increasing the scale of the content portion as a distance between an eye and the device increases.

According to yet another aspect, a device may include means for obtaining eye information associated with the device, means for determining a focal point for content based on the eye information, means for displaying the content, and means for increasing a scale of the content as a distance between an eye and the device increases.

According to a further aspect, a device may include an eye information gatherer to obtain eye information associated with the device, and processing logic. The processing logic may determine a distance between an eye and the device based on the eye information, determine a focal point for content based on the eye information, display the content, display the focal point in the content, and adjust a scale of a portion of the content corresponding to the focal point based on the distance.

Additionally, the eye information gatherer may include at least one of a distance sensor or an eye tracking sensor.

Additionally, when determining the distance between the eye and the device, the processing logic may be configured to determine the distance based on information received from the distance sensor.

Additionally, when determining the focal point for the content, the processing logic may be configured to determine the focal point based on information received from the eye tracking sensor.

Additionally, when displaying the focal point in the content, the processing logic may be configured to adjust the focal point to a point in the content based on a user inputted location.

Additionally, when determining the focal point for the content, the processing logic may be configured to determine the focal point based on a user inputted location.

Additionally, when adjusting the scale of the content portion based on the distance, the processing logic may be configured to one of continuously, discretely, logarithmically, or exponentially increase the scale of the content portion as the distance increases.

According to still another aspect, a device may include a memory to store instructions, and a processor to execute the instructions. The processor may execute instructions to determine a focal point for content based on eye information, display the content, and increase a scale of a portion of the content corresponding to the focal point as a distance between an eye and the device increases.

According to a further aspect, a method may include presenting content for display on a device, and increasing a scale of at least a portion of the content as a distance between an eye and the device increases.

According to still a further aspect, a method may include displaying a focal point in a device, increasing a scale of content corresponding to the focal point until the content is viewable, and updating content scale adjustment settings based on the determined viewable content.

BRIEF DESCRIPTION OF THE DRAWINGS

The accompanying drawings, which are incorporated in and constitute a part of this specification, illustrate an embodiment of the invention and, together with the description, explain the invention. In the drawings, FIG. 1 is an exemplary diagram illustrating concepts consistent with principles of the invention;

FIG. 2 is a diagram of an exemplary device in which systems and methods consistent with principles of the invention may be implemented;

FIG. 3 is a diagram of exemplary components of the exemplary device of FIG. 2;

FIGS. 4A-6C are diagrams of exemplary display methods according to implementations consistent with principles of the invention; and FIGS. 7-9 are flowcharts of exemplary processes according to implementations consistent with principles of the invention.

DETAILED DESCRIPTION

Figure 4B:
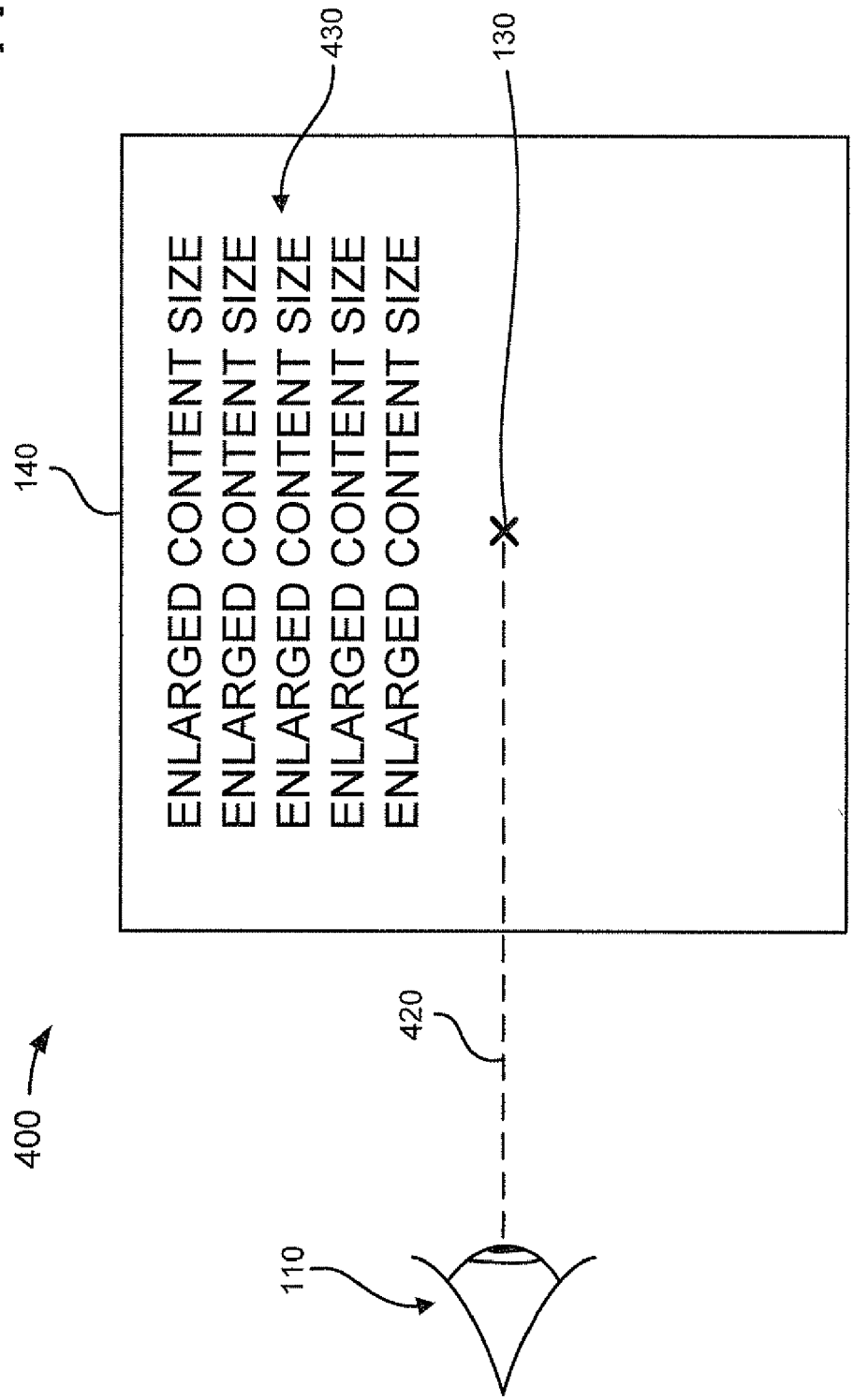

The following detailed description of the invention refers to the accompanying drawings. The same reference numbers in different drawings may identify the same or similar elements. Also, the following detailed description does not limit the invention.

Implementations consistent with principles of the invention may relate to the displaying of content based on eye information. By using eye information (e.g., the distance a device may be from the eye(s) of a user and the portion of the device display that is being focused on by the user), content having variable scales may be displayed on the device. For example, the distance of the device from the eyes of the user may be determined through a distance sensor provided in the device. The scale of the content may be adjusted based on the distance measured by the distance sensor. The portion of the device display that may be focused upon by an eye(s) (e.g., a focal point) may be determined through an eye tracking sensor provided in the device. The scale of a portion of the content may be adjusted based on the distance measured by the distance sensor and/or based on the focal point of the eye(s). For example, the scale of the content may be increased near the focal point. That is, the scale of the content near the focal point may be larger than the scale of the content further away from the focal point.

"Scale," as the term is used herein, is to be broadly interpreted to include the relationship of the size of the content normally provided on the display and the eye-distance based size of the content provided on the display. A scale may be given as a fraction or a ratio (e.g., 10:1). A representative fraction scale (e.g., 10:1) may mean that the eye-distance based size of the content may be ten times larger than the size of the content normally provided on the display. The first number (e.g., eye-distance based content size) may be different for each scale. The second number (e.g., normal content size) may be one. The larger the first number (eye-distance based content size) may be, the larger sized the content may be. A large scale (e.g., a 100:1 scale) may show large sized content. A small scale (e.g., a 2:1 scale) may show smaller sized content.

"Content," as the term is used herein, is to be broadly interpreted to include any machine-readable and machine-storable work product. Content may include, for example, an application, a program, an e-mail, a web site, a file, a combination of files, one or more files with embedded links to other files, combinations of any of the aforementioned, a link or shortcut to any of the aforementioned, etc. Content may include textual information, graphical information (e.g., icons, images, video, etc.), embedded information (such as meta information, images, hyperlinks, etc.) and/or embedded instructions (such as Javascript, etc.).

A "link," as the term is used herein, is to be broadly interpreted to include any reference to/from content from/to other content or another part of the same content.

A "device," as the term is used herein, is to be broadly interpreted to include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a distance sensor, an eye tracking sensor, a Doppler receiver, and/or global positioning system (GPS) receiver; a laptop; a GPS device; and any other computation or communication device capable of displaying content, such as a personal computer.

A "distance sensor," as the term is used herein, is to be broadly interpreted to include a proximity sensor, a laser distance sensor, a distance sensor using echo location with high frequency sound waves, an infrared distance sensor, any other distance sensors capable of measuring the distance to the eye and/or head of a user, etc.

An "eye tracking sensor," as the term is used herein, is to be broadly interpreted to include an eye gazing sensor, an infrared camera and infrared illuminator (e.g., a laser emitting diode) combination, a device used to sense, locate, and follow the movement of an eye(s), any other sensor capable of tracking eye movement, etc. For example, in one implementation, a camera may focus on one or both eyes and record movement as the user focuses upon the device. Contrast may be used to locate the center of the pupil, infrared beams may be used to create a corneal reflection, and the triangulation of both may be used to determine the focal point of the user.

Although, the distance sensor and eye tracking sensor may be described as two separate sensors, the distance sensor may be incorporated into the eye tracking sensor. For example, in one implementation consistent with principles of the invention, an infrared distance sensor may be incorporated into an infrared illuminator of the eye tracking sensor. If a light source is used for the distance sensor and/or the eye tracking sensor, the light may be invisible and of low intensity that it is safe for continued use by the user.

FIG. 1 is an exemplary diagram illustrating concepts consistent with principles of the invention. As shown in FIG. 1, a display 100 of a device may be viewed by an eye 110 of a user. Eye 110 may be located a distance 120 from display 100 and may focus on a portion of display 100, i.e., a focal point 130. Display 100 may display content 140 having a portion 150 with normal sized content. A representation (e.g., a point, a cross, etc.) of focal point 130 may be provided in content 140. For example, a representation of focal point 130 may be provided at a portion of content 140 being focused upon by eye 110. The scale of content 140 may be increased at a portion 160 of content 140 adjacent or corresponding to focal point 130. For example, as shown in FIG. 1, a scale of portion 160 closer to focal point 130 may be larger than a scale of portion 150 further away from focal point 130.

Exemplary Device Architecture

FIG. 2 is a diagram of an exemplary device 200 according to an implementation consistent with principles of the invention. As shown in FIG. 2, device 200 may include a housing 210, a speaker 220, a display 230, control buttons 240, a keypad 250, a microphone 260, a distance sensor 270, and an eye tracking sensor 280. Housing 210 may protect the components of device 200 from outside elements. Speaker 220 may provide audible information to a user of device 200. Display 230 may provide visual information to the user. For example, display 230 may provide information regarding incoming or outgoing calls, games, phone books, the current time, etc. In an implementation consistent with principles of the invention, display 230 may provide the user with information in the form of content having adjustable scales. Control buttons 240 may permit the user to interact with device 200 to cause device 200 to perform one or more operations. Keypad 250 may include a standard telephone keypad. Microphone 260 may receive audible information from the user. Distance sensor 270 may determine the distance between device 200 and an eye(s) (e.g., eye 110). Eye tracking sensor 280 may sense, locate, and follow the movement of an eye(s).

FIG. 3 is a diagram of exemplary components of device 200. As shown in FIG. 3, device 200 may include processing logic 310, storage 320, a user interface 330, a communication interface 340, an antenna assembly 350, and an eye information gatherer 360. Processing logic 310 may include a processor, microprocessor, an application specific integrated circuit (ASIC), field programmable gate array (FPGA), or the like. Processing logic 310 may include data structures or software programs to control operation of device 200 and its components. Storage 320 may include a random access memory (RAM), a read only memory (ROM), and/or another type of memory to store data and instructions that may be used by processing logic 310.

User interface 330 may include mechanisms for inputting information to device 200 and/or for outputting information from device 200. Examples of input and output mechanisms might include a speaker (e.g., speaker 220) to receive electrical signals and output audio signals, a microphone (e.g., microphone 260) to receive audio signals and output electrical signals, buttons (e.g., a joystick, control buttons 240 and/or keys of keypad 250) to permit data and control commands to be input into device 200, a display (e.g., display 230) to output visual information, and/or a vibrator to cause device 200 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and reception of the RF signals. Antenna assembly 350 may include one or more antennas to transmit and receive RF signals over the air. Antenna assembly 350 may receive RF signals from communication interface 340 and transmit them over the air and receive RF signals over the air and provide them to communication interface 340.

Eye information gatherer 360 may obtain eye information from device 200. In one implementation, the eye information may correspond to the distance between device 200 and an eye(s) (e.g., eye 110). In this case, eye information gatherer 360 may include a distance sensor (e.g., distance sensor 270) that may determine the distance between device 200 and the eye(s). In another implementation, the eye information may correspond to the movement of the eye(s) and/or the location being focused upon by the eye(s) (e.g., focal point 130) on the device display (e.g., display 230). In this case, eye information gatherer 360 may include an eye tracking sensor (e.g., eye tracking sensor 280) that may sense, locate, and follow the movement of the eye(s). In still another implementation, the eye information may correspond to a user inputted focal point. In this case, eye information gatherer 360 may include a keyboard or another type of input buttons (e.g., control buttons 240 and/or keys of keypad 250) that permits the user to enter information regarding a focal point.

As will be described in detail below, device 200, consistent with principles of the invention, may perform certain operations relating to the display of variable sized content based on eye information. Device 200 may perform these operations in response to processing logic 310 executing software instructions of an application contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Display Methods

FIGS. 4A-6C are diagrams of exemplary display methods according to implementations consistent with principles of the invention. The display methods of FIGS. 4A-6C may be conveyed on device 200 (e.g., on display 230 of device 200).

Uniform Content Scale Adjustment Based on Eye Distance

As shown in FIG. 4A, a display 400 of a device (e.g., display 230 of device 200) may display content 140 that may include a portion 150 with normal sized content. Display 400 may be viewed by eye 110, which may be located a distance 410 from display 400 and may focus on a portion of display 400, e.g., focal point 130. Distance 410 may be calculated by a distance sensor (e.g., distance sensor 270) provided in device 200. In one implementation, as shown in FIG. 4A, a representation (e.g., a point, a cross, etc.) of focal point 130 may be provided in content 140. For example, a representation of focal point 130 may be provided at a portion of content 140 being focused upon by eye 110 on display 400. In another implementation, focal point 130 may not be provided in content 140.

In one implementation consistent with principles of the invention, the scale of the content may not be adjusted if an eye(s) is close enough to the device display. For example, a predetermined threshold for content adjustment may be set by the user for the distance the eye(s) may located away from the device before the scale of the content may be adjusted. As shown in the exemplary diagram of FIG. 4A, distance 410 may be smaller than the predetermined threshold. Accordingly, content 140 of display 400 may not be adjusted and may maintain its normal size (e.g., normal sized content portion 150).

In another implementation consistent with principles of the invention, the scale of the content may be adjusted based on the distance the eye(s) is located from the device display. For example, as shown in FIG. 4B, display 400 may be viewed by eye 110, which may be located a distance 420 from display 400. Distance 420 may be greater than the predetermined threshold for content adjustment. Accordingly, content 140 of display 400 may be uniformly adjusted based on distance 420. For example, as distance 420 between eye 110 and display 400 increases, the size (e.g., scale) of content 140 may increase. Content 140 may be uniformly enlarged to display content having a larger size 430, as shown in FIG. 4B. This may enable a user to view content (e.g., larger size content 430) from distances other than directly adjacent to the eye(s).

Partial Content Scale Adjustment Based on Eye Distance and Tracking

As shown in FIG. 5A, a display 500 of a device (e.g., display 230 of device 200) may display content 140 that may include portion 150 with normal sized content. Display 500 may be viewed by eye 110, which may be located a distance 510 from display 500 and may focus on a portion of display 500, e.g., focal point 130. Distance 510 may be calculated by a distance sensor (e.g., distance sensor 270) provided in device. Focal point 130 may be calculated by an eye tracking sensor (e.g., eye tracking sensor 280). In one implementation, as shown in FIG. 5A, a representation (e.g., a point, a cross, etc.) of focal point 130 may be provided in content 140. For example, a representation of focal point 130 may be provided at a portion of content 140 being focused upon by eye 110 on display 500. In another implementation, focal point 130 may not be provided in content 140.

In one implementation, the scale of the content may not be adjusted if an eye(s) is close enough to the device display. For example, as shown in the exemplary diagram of FIG. 5A, distance 510 may be smaller than the predetermined threshold for content adjustment. Accordingly, the portion of content 140 being focused upon by eye 110 (e.g., focal point 130) may not be adjusted and may maintain its normal size (e.g., normal sized content portion 150).

Figure 5B:
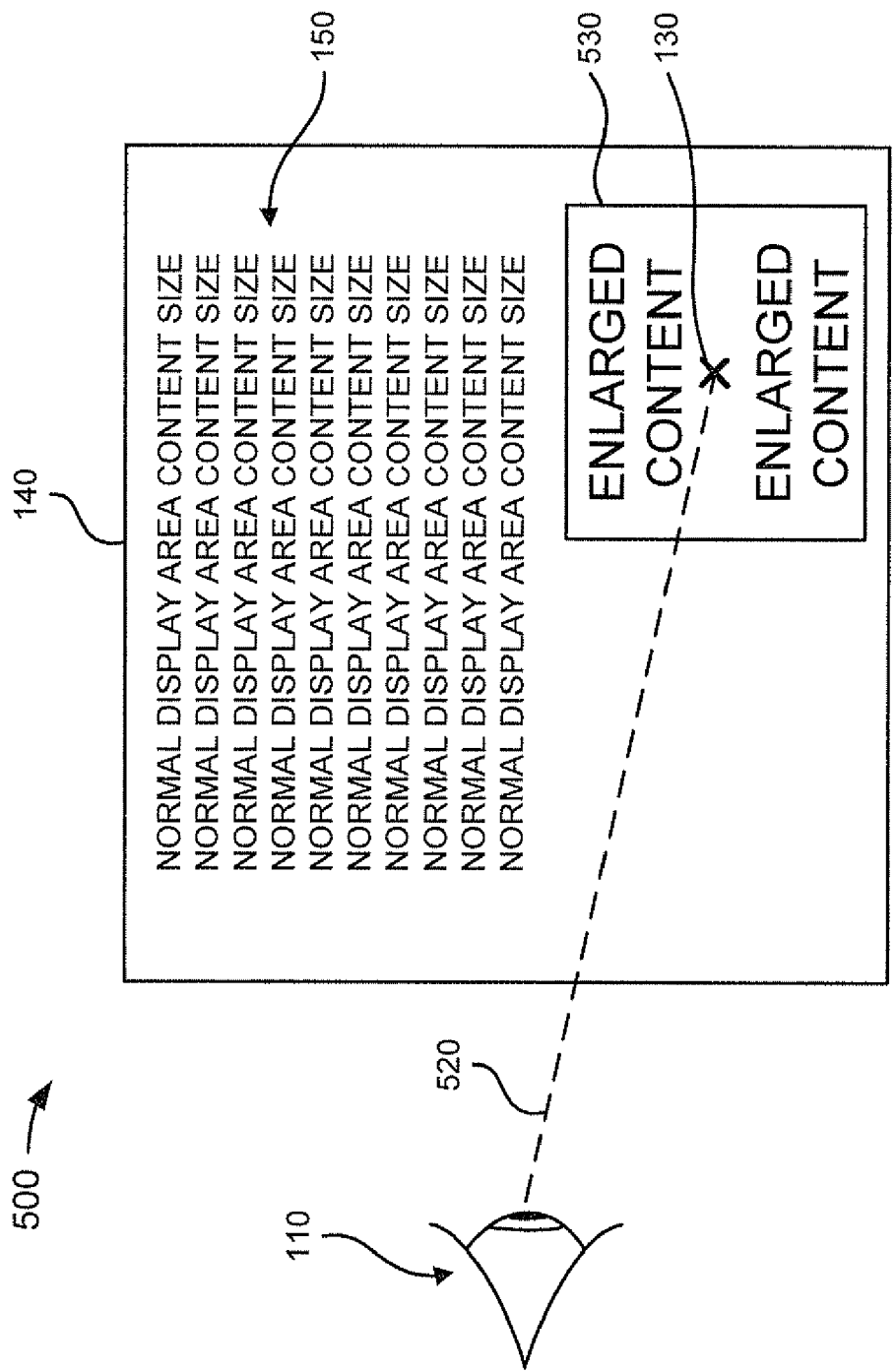

In another implementation consistent with principles of the invention, the scale of the portion of the content being focused upon (e.g., focal point 130) may be adjusted based on the distance between the eye(s) and the device display, and based on the focal point. For example, as shown in FIG. 5B, display 500 may be viewed by eye 110, which may be located a distance 520 from display 500. Distance 520 may be greater than the predetermined threshold for content adjustment. Accordingly, a portion 530 of content 140 adjacent or corresponding to focal point 130 may be determined, and may be adjusted based on distance 520. For example, as distance 520 between eye 110 and display 500 increases, the scale of content portion 530 may increase. This may enable a user to view content portion 530, which may be focused upon by the user, from distances other than directly adjacent to eye 110.

Although focal point 130 of FIGS. 1, 4A, 4B, 5A, and 5B may be automatically determined based on the portion of the display being focused upon by the eye(s), as determined by an eye tracking sensor, focal point 130 may, in an alternative implementation, be input by a user of device 200. For example, a user may input the focal point (e.g., the portion of content to be highlighted) with a keyboard or another type of input buttons (e.g., control buttons 240 and/or keys of keypad 250).

Content Scale Adjustment Settings

There are number of ways that the scale of content provided on a device display (e.g., displays 100, 400, 500) may be adjusted. For example, in one implementation, the scale of content (or a portion of content) may increase continuously as the distance between the eye(s) and the device display increases. In another implementation, the scale of content (or a portion of content) may increase in discrete steps as the distance between the eye(s) and the device display increases. In still another implementation, the scale of content (or a portion of content) may increase logarithmically as the distance between the eye(s) and the device display increases. In a further implementation, the scale of content (or a portion of content) may increase exponentially as the distance between the eye(s) and the device display increases.

In an implementation consistent with principles of the invention, any of the above-mentioned increasing methods may be set as a default by device 200. A user of device 200 may select the default and/or may change the default as desired. For example, in one implementation, as shown in FIGS. 6A-6C, a display 600 of a device (e.g., display 230 of device 200) may display content 140 that may include a portion 150 with normal sized content. A focal point 610 may be associated with a portion of content 140.

As shown in FIG. 6B, a portion 620 of content 140, adjacent or corresponding to focal point 610 (not shown), may be provided and may include variable sized content 630 that a user may be asked to view. Variable sized content 630 may increase in size until it is viewable (e.g., readable) by a user. For example, in one implementation, a user may be asked to hold device 200 at a distance from the eye(s), and may be asked to select enter with a keyboard or another type of input button (e.g., control buttons 240 and/or keys of keypad 250) when variable sized content 630 is viewable. As further shown in FIG. 6B, variable sized content 630 may be too small to read by a user.

As shown in FIG. 6C, variable sized content 630 may eventually increase in size enough that it may be viewable by a user. At this point, a user may select enter with a keyboard or another type of input button. Upon selection of enter, device 200 may update the content scale adjustment to be tailored to the user selected viewable content size. Such an arrangement may enable a user to customize device 200 to meet his/her visual capabilities. For example, a person with a visual disorder may need to increase the scale of content more so than a person with perfect vision.

Although FIGS. 1 and 4A-6C show only a single representation of a focal point on a display, more than one representation of a focal point may be provided on a display. Multiple focal point representations may be generated automatically based on the information received by an eye tracking sensor (e.g., eye tracking sensor 280), and/or manually by a user. The scale of the content adjacent or corresponding to the multiple focal point representations may increase based on the distance measured by a distance sensor (e.g., distance sensor 270).

In one implementation, a user of device 200 may control how content is displayed on device 200. For example, device 200 may include a user controlled content scaling mechanism (e.g., control buttons 240 and/or keys of keypad 250) that may permit a user to zoom in and out of any portion of content. The user controlled content scaling mechanism may alternatively or additionally be based upon how long a user focuses upon a portion of content. For example, a user may stare at a portion of content for a period time, and the scale of the portion may continue to increase (e.g., after predetermined time threshold) as the user continues to stare at the content portion. User controlled zoom functions may be utilized with any of the display methods discussed above in connection with FIGS. 4A-6C.

Although FIGS. 1 and 4A-6C show either uniform content scale adjustment based on eye distance (e.g., FIG. 4B shows uniform scale enlargement of the entire content 140) or partial content scale adjustment based on eye distance and tracking (e.g., FIG. 5B shows partial scale enlargement of content portion 530), both uniform content scale adjustment and partial content scale adjustment may be combined. For example, the scale of a content portion adjacent or corresponding to a focal point may be enlarged, and scale of the remaining portion of the same content may also be enlarged, but may not be enlarged as much as the content portion adjacent or corresponding to the focal point. Such an arrangement may ensure that all of the content is viewable to a user, while still highlighting the focal point portion of the content.

Exemplary Processing

Figure 9:
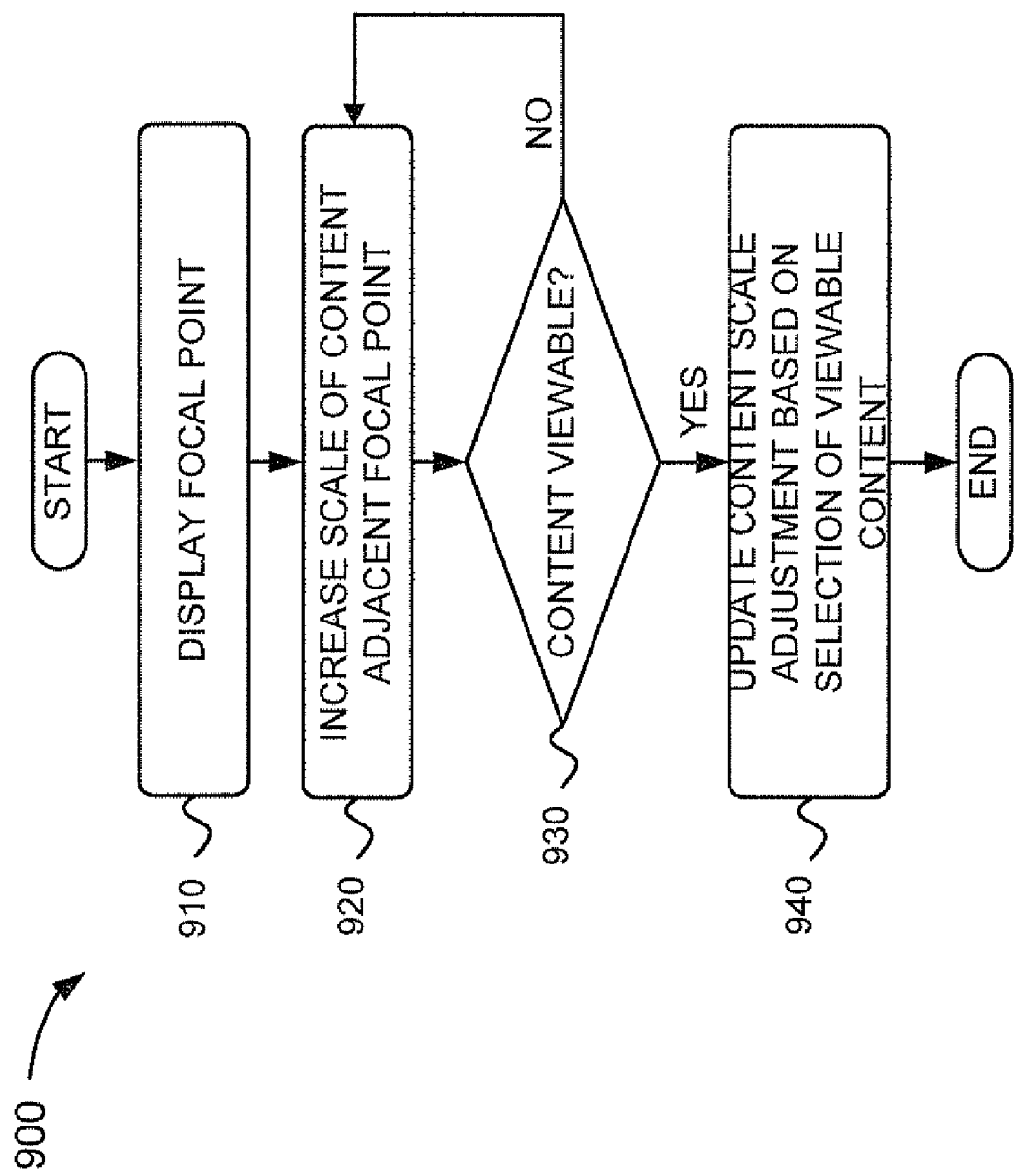

FIGS. 7-9 are flowcharts of exemplary processes according to implementations consistent with principles of the invention. The process of FIG. 7 may generally be described as uniform content scale adjustment based on eye distance. The process of FIG. 8 may generally be described as partial content scale adjustment based on eye distance and a focal point. The process of FIG. 9 may generally be described as providing the content scale adjustment settings.

Display Process Uniform Content Scale Adjustment Based on Eye Distance

As shown in FIG. 7, a display process 700 may obtain eye information (block 710). For example, in one implementation described above in connection with FIG. 3, the eye information may correspond to the distance between device 200 and an eye(s). In this case, eye information gatherer 360 may include a distance sensor (e.g., distance sensor 270) that may determine the distance between device 200 and an eye(s). In another implementation described above in connection with FIG. 3, the eye information may correspond to the movement of the eye(s) and/or the location being focused upon by the eye(s) (e.g., focal point 130) on the device display. In this case, eye information gatherer 360 may include an eye tracking sensor (e.g., eye tracking sensor 280) that may sense, locate, and follow the movement of the eye(s). In still another implementation described above in connection with FIG. 3, the eye information may correspond to a user inputted focal point. In this case, eye information gatherer 360 may include a keyboard or another type of input buttons (e.g., control buttons 240 and/or keys of keypad 250) that permits the user to enter information regarding a focal point.

As further shown in FIG. 7, process 700 may adjust the scale of the content provided on the display based on the eye information (block 720). For example, in one implementation described above in connection with FIG. 4B, content 140 of display 400 may be adjusted based on distance 420 between eye 110 and display 400. That is, as distance 420 between eye 110 and display 400 increases, the scale of content 140 may increase. In one implementation, the scale of the content may increase continuously as the distance between the eye(s) and the device display increases. In another implementation, the scale of content may increase in discrete steps as the distance between the eye(s) and the device display increases. In still another implementation, the scale of content may increase logarithmically as the distance between the eye(s) and the device display increases. In a further implementation, the scale of content may increase exponentially as the distance between the eye(s) and the device display increases.

Process 700 may display the adjusted content on the device display (block 730). For example, in one implementation described above in connection with FIG. 4B, larger size content 430, which may be enlarged based upon distance 420 between eye 110 and display 400, may be provided on display 400 of device 200.

Display Process for Partial Content Scale Adjustment Based on Eye Distance and Tracking As shown in FIG. 8, a display process 800 may obtain eye information (block 810). For example, in one implementation described above in connection with FIG. 3, the eye information may correspond to the distance between device 200 and an eye(s). In this case, eye information gatherer 360 may include a distance sensor (e.g., distance sensor 270) that may determine the distance between device 200 and eye(s). In another implementation described above in connection with FIG. 3, the eye information may correspond to the movement of the eye(s) and/or the location being focused upon by eye(s) (e.g., focal point 130) on the device display. In this case, eye information gatherer 360 may include an eye tracking sensor (e.g., eye tracking sensor 280) that may sense, locate, and follow the movement of the eye(s). In still another implementation described above in connection with FIG. 3, the eye information may correspond to a user inputted focal point. In this case, eye information gatherer 360 may include a keyboard or another type of input buttons (e.g., control buttons 240 and/or keys of keypad 250) that permits the user to enter information regarding a focal point.

As further shown in FIG. 8, process 800 may determine a focal point based on the eye information (block 820). For example, in one implementation described above in connection with FIG. 5A, display 500 may be viewed by eye 110, which may focus on a portion of display 500, e.g., focal point 130. Focal point 130 may be calculated by an eye tracking sensor (e.g., eye tracking sensor 280), and may or may not be provided at a portion of content 140 being focused upon by eye 110.

Process 800 may determine if the user wishes to adjust the focal point (block 830). If the focal point is to be adjusted (block 830—YES), then process 800 may adjust the focal point to another location other than the location determined based on the eye information (block 840). For example, in one implementation, focal point 130 may be input by a user of device 200. A user may input the focal point (e.g., the portion of content to be highlighted) with a keyboard or another type of input buttons (e.g., control buttons 240 and/or keys of keypad 250). In another implementation, multiple focal points may be input by a user of device 200 alternatively and/or additionally to the automatically determined focal point.

If the focal point is not to be adjusted (block 830—NO) or if the focal point has been adjusted (block 840), then process 800 may adjust the scale of a portion of the content based on the eye information, e.g., the eye distance and/or the focal point (block 850). For example, in one implementation described above in connection with FIG. 5B, display 500 may be viewed by eye 110, which may be located a distance 520 from display 500. Portion 530 of content 140 adjacent or corresponding to focal point 130 may be adjusted based on distance 520. That is, as distance 520 between eye 110 and display 500 increases, the scale of content portion 530 may increase. In one implementation, the scale of the content may increase continuously as the distance between the eye(s) and the device display increases. In another implementation, the scale of content may increase in discrete steps as the distance between the eye(s) and the device display increases. In still another implementation, the scale of content may increase logarithmically as the distance between the eye(s) and the device display increases. In a further implementation, the scale of content may increase exponentially as the distance between the eye(s) and the device display increases.

As further shown in FIG. 8, process 800 may display the adjusted content portion on the device display (block 860). For example, in one implementation described above in connection with FIG. 5B, enlarged content portion 530, which may be enlarged based upon distance 520 between eye 110 and display 500, may be provided on display 500 of device 200.

Process Providing Content Scale Adjustment Settings

As shown in FIG. 9, a process 900 may display a focal point on a device display (block 910). For example, in one implementation described above in connection with FIG. 6A, display 600 of a device (e.g., display 230 of device 200) may display content 140 that may include portion 150 with normal sized content. Focal point 610 may be provided at a portion of content 140. Process 900 may increase the scale of the content adjacent or corresponding to the focal point (block 920). For example, in one implementation described above in connection with FIG. 6B, portion 620 of content 140, adjacent or corresponding to focal point 610, may be determined and may include variable sized content 630 that a user may be asked to view. Variable sized content 630 may increase in size until it is viewable (e.g., readable) by a user. For example, a user may be asked to hold device 200 at a distance from the eye(s), and may be asked to select enter with a keyboard or another type of input button (e.g., control buttons 240 and/or keys of keypad 250) when variable sized content 630 is viewable.

As further shown in FIG. 9, process 900 may determine if the content adjacent or corresponding to the focal point is viewable (block 930). If the content is not viewable (block 930—NO), then process 900 may continue to increase the scale of the content adjacent or corresponding to the focal point (block 920). If the content is viewable (block 930—YES), then process 900 may update the content scale adjustment based on the selection of the viewable content (block 940). For example, in one implementation described above in connection with FIG. 6C, variable sized content 630 may eventually increase in size enough that it may be viewable by a user. At this point, a user may select enter with a keyboard or another type of input button. Upon selection of enter, device 200 may update the content scale adjustment to be tailored to the user selected viewable content size. Such an arrangement may enable a user to customize device 200 to meet his/her visual capabilities. For example, a person with a visual disorder may need to increase the scale of content more so than a person with perfect vision.

CONCLUSION

Systems and methods consistent with principles of the invention may, based on eye information (e.g., the distance a device may be from an eye(s) and the portion of the device display that is being focused upon by the eye(s)), display content having variable scales on a device. The scale of the content may be adjusted based on the distance measured by a distance sensor provided in the device. The portion of the device display that is being focused upon by an eye(s) (e.g., a focal point) may be determined through an eye tracking sensor provided in the device. The scale of the content (or portion of the content) may be adjusted based on the distance measured by the distance sensor and/or based on the focal point of the eyes.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 7-9, the order of the acts may be modified in other implementations consistent with principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   displaying, via a display associated with a device, content at a first size;
   determining, via a distance sensor associated with the device, a distance between an eye and the device;
   determining, via an eye tracking sensor associated with the device, a portion of the content being focused upon by the eye;
   automatically adjusting, via a processor associated with the device, a size of the portion of the content to a second size, greater than the first size, based on the distance and in response to determining the portion of the content being focused upon by the eye;
   maintaining, via the processor, the content, other than the adjusted portion of the content, at the first size; and
   displaying, via the display, the portion of the content at the second size simultaneously with the maintained content at the first size.

2. The method of claim 1, where automatically adjusting, via a processor associated with the device, a size of the portion of the content comprises:
   decreasing the size of the portion of the content to the first size as the distance decreases.

3. The method of claim 1, where adjusting, via a processor associated with the device, a size of the portion of the content comprises:
   increasing the size of the portion of the content to the second size as the distance increases.

4. The method of claim 3, where increasing the size of the portion of the content comprises one of:
   increasing the size of the portion of the content continuously to the second size as the distance increases;
   increasing the size of the portion of the content in discrete steps to the second size as the distance increases;
   increasing the size of the portion of the content logarithmically to the second size as the distance increases; or
   increasing the size of the portion of the content exponentially to the second size as the distance increases.

5. The method of claim 1, further comprising:
   adjusting the size of the portion of the content based on a user controlled content scaling.

6. The method of claim 3, where increasing the size of the portion of the content comprises:

increasing the size of the portion of the content until the size of the portion of the content is viewable by the eye.

7. The method of claim 1, further comprising:
determining the portion of the content being focused upon by the eye, as a focal point, with the eye tracking sensor.

8. The method of claim 7, further comprising:
adjusting the focal point to a point in the content based on a user inputted location.

9. The method of claim 8, further comprising:
adjusting a size of a portion of the content corresponding to the adjusted focal point to the second size, based on the distance.

10. A method comprising:
displaying, via a display associated with a device, content at a first scale;
obtaining, via a distance sensor and an eye tracking sensor associated with the device, eye information that includes:
  a distance between an eye and the device, and
  a portion of the content being focused upon by the eye;
adjusting, via a processor associated with the device, a scale of the portion of the content to a second scale, greater than the first scale, based on the eye information;
maintaining, via the processor, the content, other than the adjusted portion of the content, at the first scale; and
displaying, via the display, the portion of the content at the second scale simultaneously with the content at the first scale.

11. The method of claim 10, further comprising:
increasing the scale of the portion of the content to the second scale as the distance between the eye and the device increases.

12. A device comprising:
means for displaying content at a first scale;
means for obtaining eye information associated with the device, the eye information including:
  a distance between an eye and the device, and
  a portion of the content being focused upon by the eye;
means for increasing a scale of the portion of the content to a second scale, greater than the first scale, as a distance between the eye and the device increases;
means for maintaining the content, other than the portion of the content, at the first scale; and
means for displaying the portion of the content at the second scale simultaneously with the content at the first scale.

13. A device comprising:
a display that displays content at a first scale;
an eye information gatherer that obtains eye information associated with the device, the eye information including information corresponding to:
  a distance between an eye and the device, and
  a portion of the content being focused upon by the eye; and
processing logic to:
  determine a distance between the eye and the device based on the eye information,
  determine a focal point of the content based on the eye information,
  display, via the display, the content at the first scale,
  display the focal point in the content displayed on the display,
  adjust a scale of the portion of the content corresponding to the focal point to a second scale, greater than the first scale, based on the distance,
  maintain the content, other than the portion of the content, at the first scale and
  display, via the display, the portion of the content at the second scale simultaneously with the content at the first scale.

14. The device of claim 13, where the eye information gatherer includes:
a distance sensor; and
an eye tracking sensor.

15. The device of claim 14, where when determining a distance between the eye and the device, the processing logic is configured to determine the distance based on information received from the distance sensor.

16. The device of claim 14, where when determining a focal point of the content, the processing logic is configured to determine the focal point based on information received from the eye tracking sensor.

17. The device of claim 13, where when displaying the focal point in the content, the processing logic is configured to adjust the focal point to a point in the content based on a user inputted location.

18. The device of claim 13, where when determining a focal point of the content, the processing logic is configured to determine the focal point based on a user inputted location.

* * * * *